A. C. LINDGREN.
SEEDING MACHINE.
APPLICATION FILED JULY 22, 1911. RENEWED FEB. 8, 1916.

1,195,483.

Patented Aug. 22, 1916.
5 SHEETS—SHEET 1.

Attest:

Inventor:
by
Attys

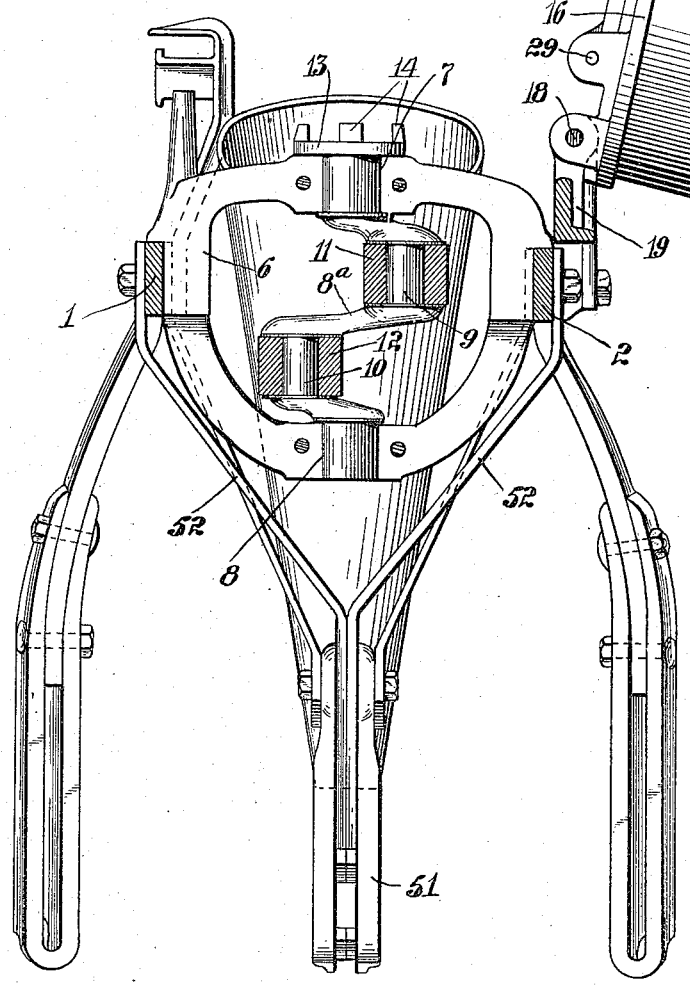

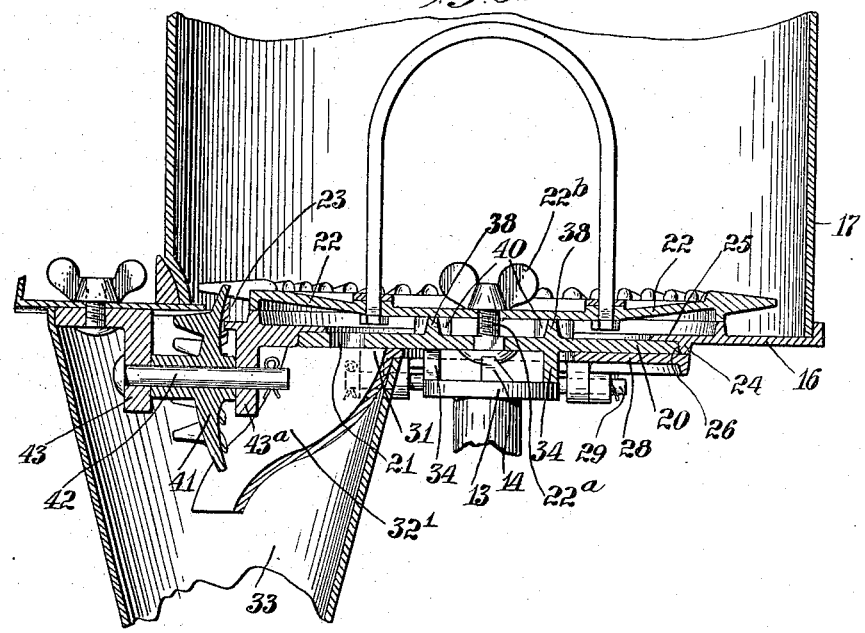
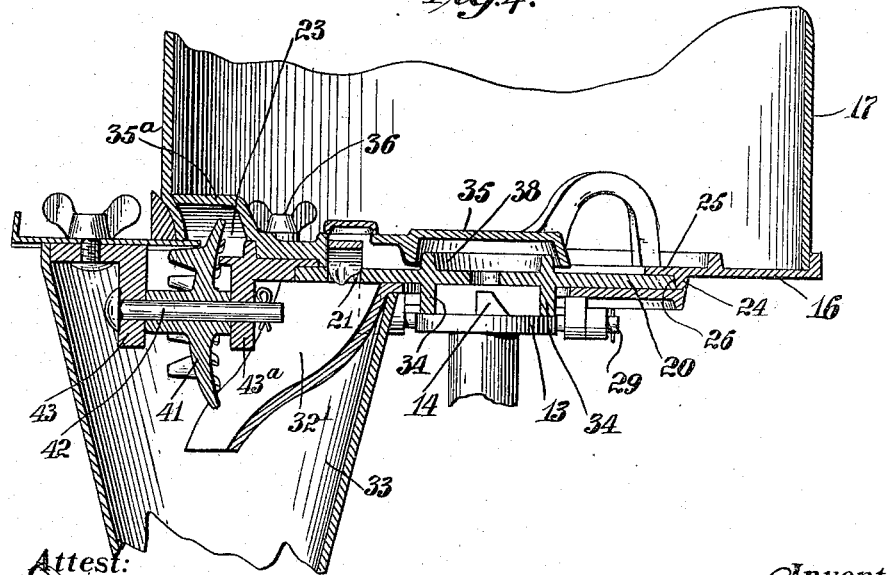

A. C. LINDGREN.
SEEDING MACHINE.
APPLICATION FILED JULY 22, 1911. RENEWED FEB. 8, 1916.

1,195,483.

Patented Aug. 22, 1916.
5 SHEETS—SHEET 4.

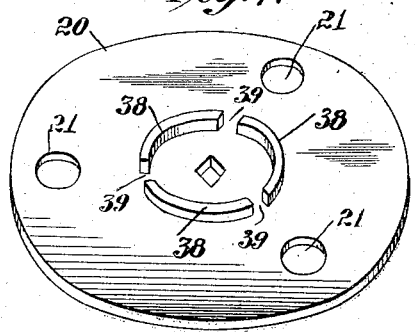
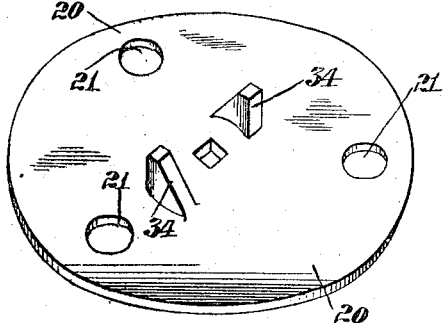
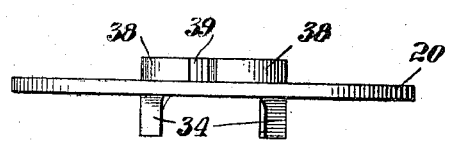
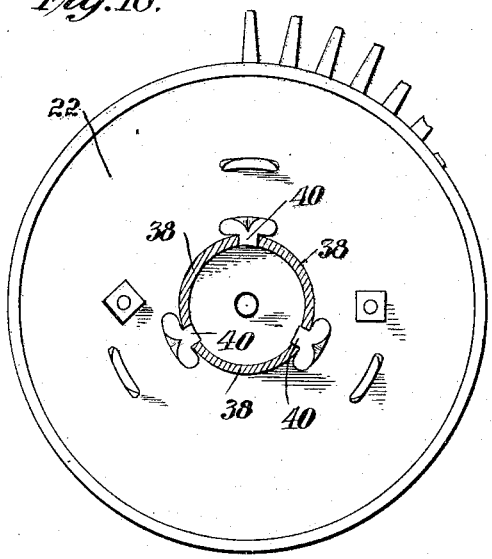
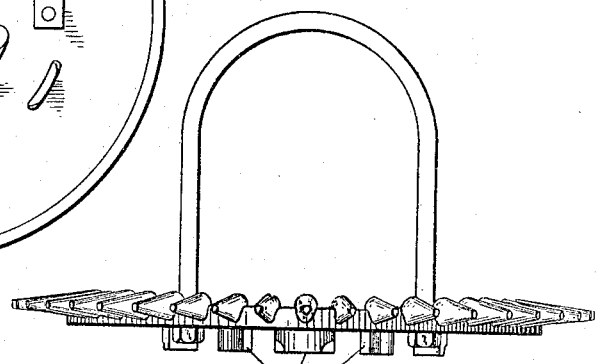

UNITED STATES PATENT OFFICE.

ALEXUS C. LINDGREN, OF MOLINE, ILLINOIS, ASSIGNOR TO MOLINE PLOW COMPANY, A CORPORATION OF ILLINOIS.

SEEDING-MACHINE.

1,195,483.      Specification of Letters Patent.      Patented Aug. 22, 1916.

Application filed July 22, 1911, Serial No. 639,893. Renewed February 8, 1916. Serial No. 77,022.

*To all whom it may concern:*

Be it known that I, ALEXUS C. LINDGREN, a citizen of the United States, residing at Moline, in the county of Rock Island and State of Illinois, have invented certain new and useful Improvements in Seeding-Machines, of which the following is a specification, reference being had therein to the accompanying drawing.

This invention relates to seeding machines and has reference more particularly to that type of mechanism in which provision is made by an interchange of parts to plant different kinds of seeds, for instance, cotton seed or corn seed, and the like. Machines of this general type embody usually a rotary driving member, with which may be removably interlocked, different kinds of seed plates so that by the interchange of these plates the machines may be adapted for planting different kinds of seeds.

My invention consists of an improved construction and arrangement of the parts of a seeding mechanism of this general type, whereby the change from one kind of seed plate to another may be expeditiously and conveniently made, and whereby the plate which for the time being is in use, will have firm and effective operative connection with the driving means.

Figure 1:
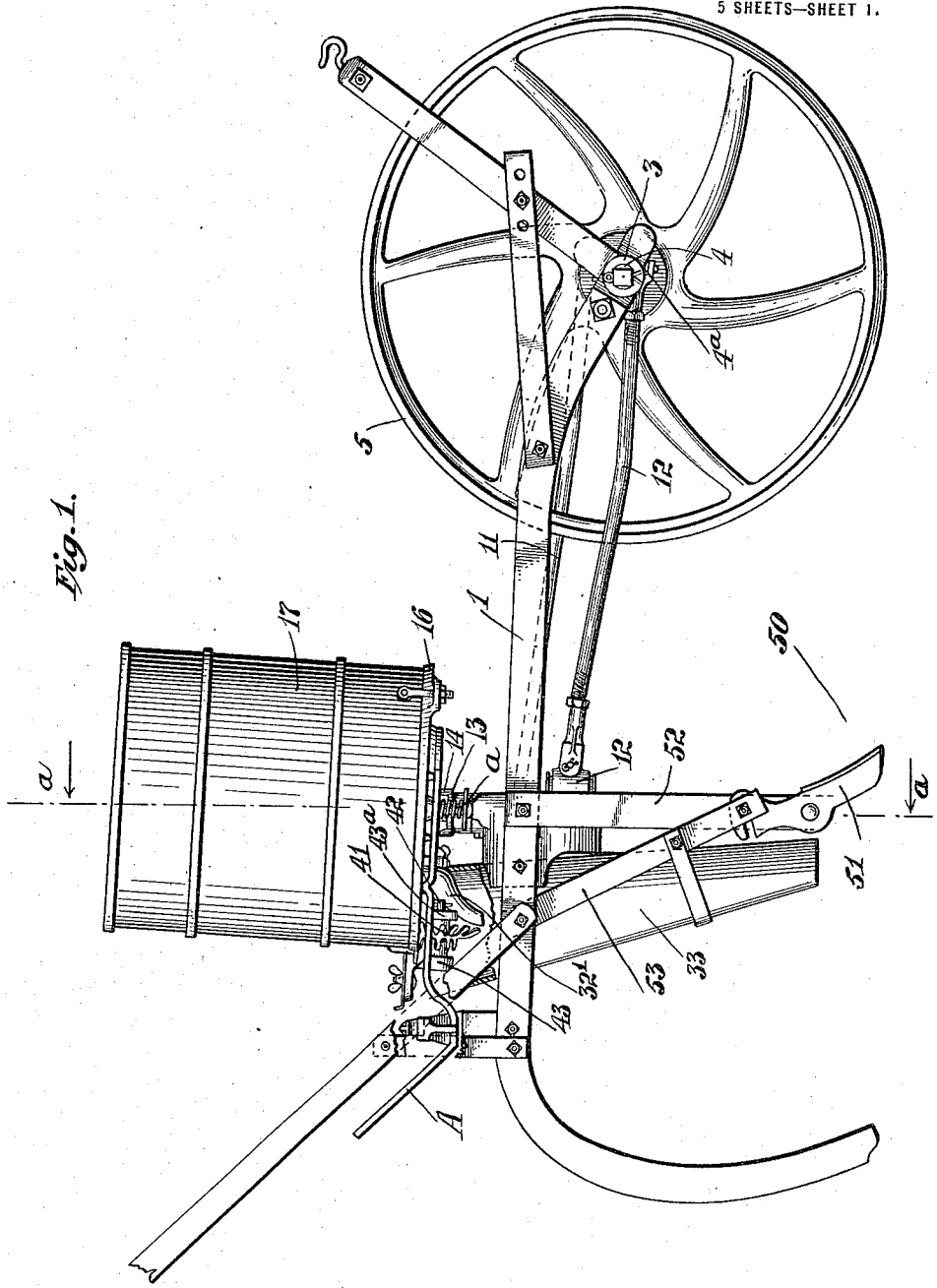
Figure 5:
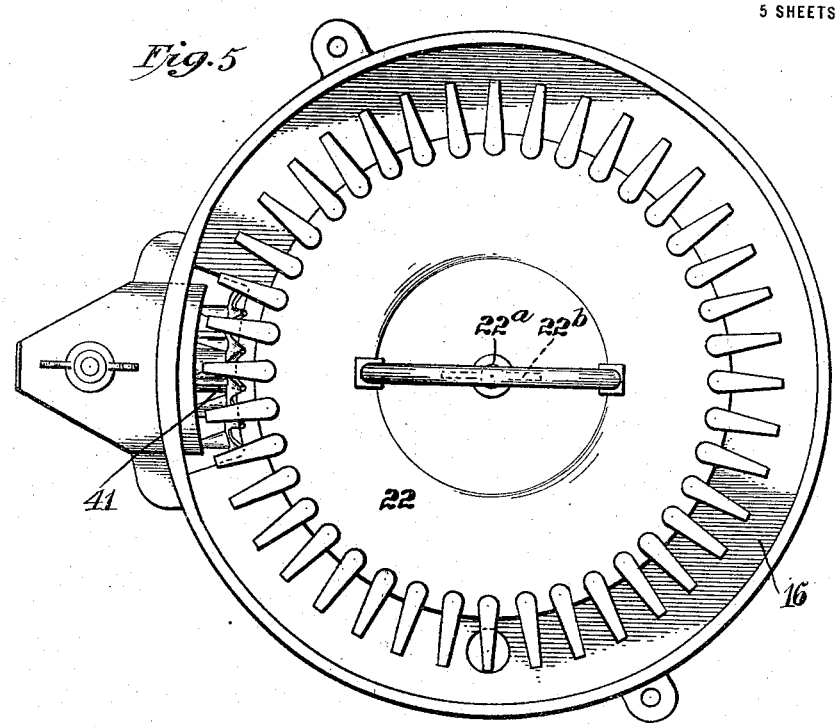
Figure 6:
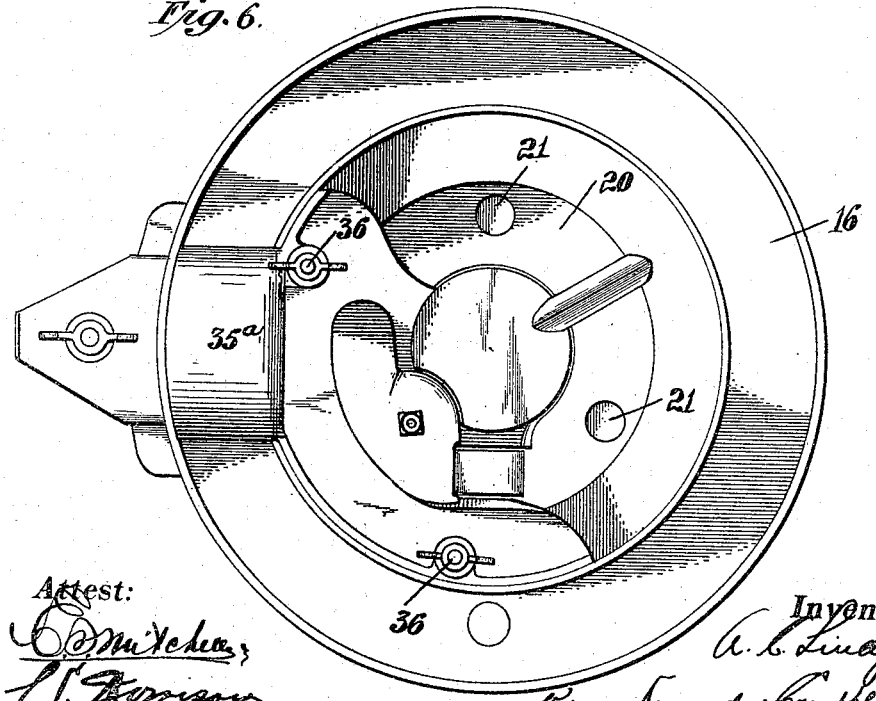

In the accompanying drawings: Figure 1 is a side elevation of a seeding machine having my invention embodied therein. Fig. 2 is a transverse sectional elevation on the line *a—a* of Fig. 1, showing the seed can with the seed distributing mechanism lifted to permit the change of plates to be made. Fig. 3 is a longitudinal sectional elevation through the seed discharging mechanism, showing the same arranged for planting cotton seed. Fig. 4 is a similar view showing the mechanism arranged for planting a different kind of seed, such as corn. Fig. 5 is a plan view of the seeding mechanism arranged to plant cotton seed. Fig. 6 is a similar view showing the mechanism arranged for planting corn. Fig. 7 is a top perspective view of the corn planting plate removed. Fig. 8 is a bottom perspective view of the same. Fig. 9 is an edge view of the same. Fig. 10 is a bottom view of the cotton planting plate removed. Fig. 11 is an edge view of the same.

Referring to the drawings: The frame of the machine may be of any appropriate form and construction adapted to support the operative parts. In the present instance it comprises two fore and aft frame bars 1 and 2 extending downwardly at their rear ends to adapt them to carry covering plates or shovels, and provided at their forward ends with bearings 3—3 to receive the axle 4 of a ground wheel 5, by which motion is imparted to the seed distributing mechanism in a manner to be described more fully hereinafter.

Fixed between the two frame bars about midway of their length is a yoke or casting 6 open at its center and presenting upper and lower cross-bars provided with journal bearings 7 and 8 respectively. In these bearings is mounted the upper and lower ends respectively of a vertical rotary crank shaft $8^a$ formed with an upper crank 9 and a lower crank 10, on which are mounted respectively the rear ends of two pitmen 11 and 12, whose forward ends are connected respectively with two cranks $4^a$ and $4^b$ on the horizontal axle 4, by means of which the rotation of the ground wheel, as the machine travels over the field, will be imparted to the vertical crank shaft 8 and by said crank shaft will be transmitted to a driving head 13 fixed to the upper end of the shaft. The head 13 is in the form of a horizontal disk having upwardly projecting driving lugs 14 adapted to be drivingly interlocked with the seed discharging mechanism now to be described.

It will be understood that the special means just described for imparting motion from the ground wheel to the seeding mechanism may be variously modified and changed, inasmuch as the form of the driving mechanism is immaterial as far as the specific construction of the seeding mechanism is concerned. I have illustrated and described a form of driving mechanism consisting of the angularly related crank shafts and the connecting pitmen, which is very effective in operation and which is of peculiar advantage in connection with machines of this character, in the respect that it avoids the use of intermeshing gears and other forms of driving mechanisms, such as sprocket chains, and therefore avoids danger of interference with the action of the parts by the clogging or accumulation of dirt.

The seed discharging mechanism is mounted on and carried by a base plate 16 forming the bottom of a seed can or hopper 17, which plate is hinged at one side, as by a horizontal fore and aft pivot pin 18, to a bracket 19 fixed to the side bar 2 of the frame, so that the entire seed discharging mechanism may be swung upwardly to a vertical position, as shown in Fig. 2, in which position the under side of the base plate will be exposed in order to effect interchange of the seed plates, or the application of the cotton seed plate, as will be described later on.

The base plate 16 is so formed that seed may pass therethrough at two points, one near the edge of the plate when cotton seed is being planted, and one near the center of the plate when corn is being planted, the discharge of the latter being controlled by a seed plate 20 mounted in the central opening in the base plate and provided, as shown in Fig. 3, with seed cells 21; and the discharge of the cotton seed being controlled by a special cotton-seed plate 22, adapted to be secured over the plate 20 to cover the cells therein and acting to effect the discharge of the cotton seed through an opening 23 near the outer edge of the base plate, as shown in Fig. 3.

As shown more particularly in Figs. 4 and 6, which illustrate the mechanism arranged to plant corn, the base plate is provided a slight distance outward of its central opening with a depending annular rib 24, producing a horizontal annular shoulder 25 and a vertical annular shoulder 26, the seed plate 20 being seated within the annular shoulder 26 and against the shoulder 25, so as to freely rotate in its seat, and the lower face of the plate being flush with the lower face of the rib 24. The seed plate is held removably and rotatably in place by means of an annular confining plate 28 hinged at one side to the under side of the base plate on a horizontal fore and aft pivot pin 29 adjacent the pivot pin 18 before alluded to, and adapted to close across the under face of the seed plate and bear against the rib 24, so as to confine the seed plate in its seat, in which position the plate 28 is locked by means of a swinging spring-pressed latch 30 mounted on the under side of the base plate and adapted to engage in a notch in a lug 32 depending from the under side of the confining plate.

As a result of the construction described, the seed plate may be readily removed for replacement of another one, by tipping the entire mechanism upwardly to the position shown in Fig. 2, and then releasing the latch 30 and swinging the confining plate downwardly away from the base plate, this action wholly uncovering and releasing the seed plate and permitting its ready removal and its replacement, if desired, by another plate with different kinds of cells or cells arranged in other relations.

In order that the mechanism may be conveniently lifted, I provide a handle A consisting of a bar pivoted at its inner end to the base plate near its outer edge and acted on by a spring $a$ surrounding the pivot bolt, so as to create a frictional contact between the bar and the plate. When the mechanism is to be tilted, this handle is turned on its pivot outwardly so as to extend transversely, and when not in use, it is swung inwardly so as to extend in a fore and aft direction, the spring pressure serving to create sufficient friction between the bar and plate to hold it in its inoperative position.

At its rear edge the confining plate is formed with an open recess 31 in such position that in the rotation of the seed plate 20, the cells therein will pass over and register with this opening, the result being that the seed will be discharged through the confining plate and will be directed by a rearwardly inclined spout 32' connected to the confining plate and surrounding said recess and into the upper end of a seed tube 33 fixed to the frame of the machine and leading down to the ground.

The under side of the seed plate 20 is provided with driving lugs 34—34 which, when the base plate is in a horizontal position with the seed distributing mechanism operative, will extend downwardly through the central opening in the confining plate and between the upstanding driving lugs 14 on the driving head 13 before alluded to, and will be interlocked with the driving head so that the rotary motion imparted to the driving head will be transmitted to the seed plate. As shown in Fig. 6, the usual cut-off and knocker mechanism is employed when the seed plate 20 is in operation for planting corn, this mechanism being mounted in the under side of a cap 35 seated on the base plate and removably attached thereto by bolts 36—36 extending upwardly through the base plate and cap and provided with confining nuts. At its rear side edge the cap is formed with an upwardly extending hollow boss or swell 35$^a$ which extends over and covers the cotton seed opening in the base plate, so that no seed can pass through said opening 23.

When the machine is to be employed for planting cotton, it is not necessary to remove the seed plate 20 which was used for planting corn, but this plate is left in the machine and acts to impart motion to the special form of plate 22 shown in Figs. 10 and 11, for planting cotton. To adapt the seed plate 20 to perform this function it is provided on its upper face with a series of segmental ribs 38—38—38, spaced apart at their ends so as to produce sockets or notches 39, 39, 39, which, when the cotton seed plate is seated on the seed plate 20, after first removing the cut-off and knocker mechanism, before alluded to, will receive lugs 40, 40, 40, depending from the under side of the cotton seed plate, the result being that the rotary motion imparted, as before described, to the plate 20, will be transmitted to the cotton seed plate. The cotton seed plate is firmly fixed in position on the plate 20 by means of a bolt 22$^a$ passed upwardly through the central opening in the plate 20 and through a central opening in the plate 22, and provided at its upper end with a wing nut 22$^b$ by which the cotton seed plate may be clamped firmly down on the plate 20 with the driving lugs interlocked.

The cotton-seed plate 22 is of a diameter sufficiently large to fully cover the cells in the plate 20 so that no seed can enter said cells. At its outer edge the plate 22 is provided with a series of radial teeth as usual, which engage teeth on a vertical wheel 41 mounted loosely on a horizontal pin 42 fixed between lugs 43, 43$^a$ depending from the under side of the base plate at the front and rear of the opening 23, in such position that the teeth of the wheel 41 will extend upwardly through said opening and in the path of the teeth on the cotton-seed plate.

From the foregoing construction it will be observed that the change in plates, either the removal and substitution of plate 20, or the application of the cotton-seed plate, may be conveniently effected by tipping the base plate and mechanism carried thereby, upwardly to expose the under side of the same. In such position access may be readily had either to the under side of the mechanism carried by the base plate, or the opposite side of the same within the seed can. Further, it will be seen that when the change is made from corn to cotton planting, it is but necessary to remove the cap plate carrying the cut-off and knocker mechanism, and to apply the cotton-seed plate directly to the corn plate 20.

The furrow in which the seed is planted is formed by a blade 50 fixed to a frog or casting 51 attached to the lower end of two bars 52—52 extending upwardly and outwardly, and having their upper ends fixed to the side bars of the frame, suitable braces 53 being connected at their upper ends to the frame bars and at their lower ends to the frog, and serving to hold the parts firmly and rigidly in an upright position, so as to withstand the strains due to the formation of the furrow.

In the foregoing description and in the accompanying drawings I have disclosed my invention, embodied in the form and detailed construction which I prefer to adopt and which has been found to answer to a satisfactory degree the ends to be attained, but it will be understood that various changes may be made in these details without departing from the limits of my invention; and it is to be further understood that the invention is not limited to any particular form or construction of the parts, except in so far as such limitations are specified in the claims.

Having thus described my invention, what I claim is:—

1. In a seeding machine, the combination of a seed can or hopper provided with an outer opening for the discharge of cotton seed and an inner opening for the discharge of corn, a rotary seed plate mounted in the hopper for discharging corn through the inner opening, a removable cotton seed discharging plate adapted to be applied over the corn discharging plate and to cover said inner opening and coöperating with said outer opening in discharging cotton therethrough, and a removable cap plate adapted to be applied directly over the corn plate when the other plate is removed, and to cover said outer opening, said cap plate being provided with a cut-off and knocker mechanism to coöperate with said inner opening.

2. In a seeding machine and in combination with a frame, a seed can or hopper pivoted near its side to said frame on a fore and aft horizontal axis to swing upwardly therefrom, and provided with a seed discharging mechanism, a horizontally arranged lifting handle pivoted directly to the hopper on a vertical axis at the side of said can opposite its pivotal connection with the frame, so that the handle may be swung from an inoperative fore and aft position, to an operative transverse position and in the said latter position can be employed to lift the can upwardly on its pivotal axis.

3. In a seeding machine, the combination of a seed can or hopper provided with two discharge openings different distances from the center to discharge different kinds of seed, means mounted in said can or hopper and operable to discharge seeds through either of the openings at will, a seed tube to receive the discharged seed and convey the same to the ground, and a spout arranged within said tube in position to receive the seed directly from said inner discharge opening.

4. In a seeding machine, the combination of a seed can or hopper provided with two discharge openings different distances from the center to discharge different kinds of seed, means mounted in said can or hopper and operable to discharge seeds through either of the openings at will, a seed tube to receive the discharged seed and convey the same to the ground, and a depending spout arranged within the seed tube in position to receive the seed directly from the inner discharge opening, the lower end of said spout terminating vertically or substantially so beneath the outer discharge opening.

In testimony whereof I have affixed my signature in presence of two witnesses.

ALEXUS C. LINDGREN.

Witnesses:
L. C. BLANDING,
JAMES J. LAMB.